United States Patent [19]
Dufresne et al.

[11] Patent Number: 5,922,638
[45] Date of Patent: Jul. 13, 1999

[54] PROCESS FOR PRESULFURIZING HYDROTREATMENT CATALYSTS

[75] Inventors: Pierre Dufresne, Valence; Nilanjan Brahma, La Voulte Sur Rhone, both of France

[73] Assignee: Europeene de Retraitement de Catalyseurs Eurecat, France

[21] Appl. No.: 08/881,258

[22] Filed: Jun. 24, 1997

Related U.S. Application Data

[XX .
[60] Provisional application No. 60/020,407, Jun. 25, 1996.

[30] Foreign Application Priority Data

Jun. 12, 1996 [FR] France .................................. 96 07283

[51] Int. Cl.$^6$ ....................................................... B01J 27/02
[52] U.S. Cl. ................................................................ 502/216
[58] Field of Search ............................................. 502/216

[56] References Cited

U.S. PATENT DOCUMENTS

| | | | |
|---|---|---|---|
| 5,041,404 | 8/1991 | Seamans et al. | 502/150 |
| 5,139,983 | 8/1992 | Berrebi et al. | 502/33 |
| 5,397,756 | 3/1995 | Dufresne et al. | 502/33 |
| 5,654,252 | 8/1997 | Dufresne et al. | 502/220 |

FOREIGN PATENT DOCUMENTS

| | | |
|---|---|---|
| 0 447 221 | 9/1991 | European Pat. Off. . |
| 0 448 435 | 9/1991 | European Pat. Off. . |
| 0 530 068 | 3/1993 | European Pat. Off. . |
| 0 564 317 | 10/1993 | European Pat. Off. . |
| 0 707 890 | 4/1996 | European Pat. Off. . |

*Primary Examiner*—Elizabeth D. Wood
*Attorney, Agent, or Firm*—Miller, White, Zelano, & Branigan, P.C.

[57] ABSTRACT

The invention relates to a process for ex-situ presulfurization of porous particles of a hydrocarbon hydroconversion catalyst that contains at least one metal or metal oxide, comprising bringing catalytic particles into contact with a presulfurizing agent that contains elementary sulfur and at least one organic liquid. It is characterized in that the process comprises preparing the presulfurizing agent in the form of an essentially homogeneous liquid and impregnating the catalyst particles with said liquid, with said elementary sulfur consequently being incorporated for the most part into the pores of the catalyst.

14 Claims, No Drawings

PROCESS FOR PRESULFURIZING HYDROTREATMENT CATALYSTS

CROSS-REFERENCE TO RELATED APPLICATION

This application is related to provisional application Ser. No. 60/020,407 filed Jun. 25, 1996 (Attorney Docket No. PET 1385 VI).

BACKGROUND OF THE INVENTION

This invention relates to a process for ex-situ presulfurization of generally porous particles of hydrocarbon hydroconversion catalysts. The invention also relates to processes for ex-situ presulfurization of porous particles of hydrotreatment catalysts, followed by in-situ or ex-situ activation of the catalysts that are thus sulfurized by a reducing compound, particularly a gas that contains hydrogen. The invention also relates to the use of catalysts that are thus presulfurized and optionally activated for the hydroconversion of hydrocarbon feedstocks.

Hydroconversion catalysts are widely used in industry, for example for hydrodesulfurization and/or hydrodenitrogenation and/or hydrodemetallization of hydrocarbon feedstocks that contain sulfurous, nitrogenous, and/or metal impurities. They are also commonly used in cases where the feedstock contains unsaturated components that should be saturated: here again, the hydrotreatment catalysts provide a solution. These processes are also called hydrotreatment processes. It is also common practice to use hydrocracking hydrocarbon feedstocks. Knowing what process will be carried out in actuality and to what extent depends on the conditions selected (feedstock, catalyst, pressure, temperature, etc.). In all these processes, the feedstock is brought into contact with the hydrogen-containing gas within a reactor, under conditions that comprise high pressure and high temperature.

The hydroconversion catalysts are well-known to one skilled in the art. They contain hydrogenation metals that are placed on a substrate that may or may not be amorphous or zeolitic, or mixtures of these substrates.

The metals that are commonly used are cobalt, nickel, molybdenum, and tungsten, generally in combination, particularly the cobalt/molybdenum, nickel/molybdenum, cobalt/tungsten and nickel/tungsten combinations. The hydrotreatment catalysts may also contain noble metals, for example, platinum, palladium and/or rhenium.

The substances that are most frequently used as substrates are alumina, silica, silica/alumina, and magnesium. The substrate can also consist of or contain a zeolite, for example a zeolite such as Y. Normally, when zeolites are used, they are used in combination with one or more of the other above-mentioned substances that are used as a substrate.

After the preparation of the catalyst, the hydrogenation metals are generally in oxidized form. This also applies to used catalysts that have undergone regeneration treatment.

It has been known for a long time that the metals should be in the form of their sulfides to obtain optimal results. The metal oxides (or the metals themselves in the case of zero-valence metals) should therefore be converted into corresponding sulfides.

This sulfurization is traditionally carried out in-situ, i.e., within the reactor in which the catalyst is to be used, generally by bringing the catalytic particles into contact, in the reactor and at an increasing temperature, with a combination a hydrogen-containing gas and hydrogen sulfide or a combination of hydrogen-containing gas and a hydrocarbon flow that is often diluted with a sulfurated compound.

Developments have occurred over the last ten to fifteen years, wherein specialized companies now supply the catalyst with the amount of sulfur or sulfurated compound that is required for the final ex-situ sulfurization, i.e., outside the treatment reactor, generally at another site; this process is called ex-situ presulfurization. One of the advantages of such ex-situ presulfurization lies in the fact that the refiner who acquires the catalyst can proceed with activation in a relatively easy manner; to obtain the desired formation of metal sulfides, all the refiner has to do is treat the catalyst with a hydrogen-containing gas within the treatment reactor. The other main advantages of this process lie in the fact that it reduces the down time of the reactor and that it allows the refiner to avoid using toxic chemical products such as hydrogen sulfide and mercaptans.

Several ex-situ presulfurization methods developed over the last few years use elemental sulfur. These methods are described in, among other things, U.S. Pat. Nos. 4,943,547 and 5,215,954. The methods that are described in U.S. Pat. No. 4,943,547 comprise bringing the elemental sulfur into contact with the catalytic particles that are to be presulfurized, either in the form of powdered sulfur, which is then sublimated in the pores of the catalyst, with the mixture that is obtained then being wetted with a high-boiling oil or a hydrocarbon solvent, or in the form of a suspension that was previously prepared from elemental sulfur in a high-boiling or a hydrocarbon solvent. In U.S. Pat. No. 5,215,954, which follows up on U.S. Pat. No. 4,943,547, a liquid olefin is used instead of a high-boiling oil or a hydrocarbon solvent. In all these methods, the catalytic particles are brought into contact with elemental sulfur into the pores of the catalyst by sublimation or by melting requires accurate monitoring of the conditions of the process, which is difficult to ensure.

An object of this invention is to mitigate these difficulties.

SUMMARY OF THE INVENTION

Upon further study of the specification and appended claims, further objects and advantages of this invention will become apparent to those skilled in the art.

To obtain these objects, there is first provided a process for presulfurization of catalytic particles that uses elemental sulfur, which is relatively easy to implement and produces a truly homogeneous distribution of the elemental sulfur in the pores of the catalyst. This process avoids having to mix the solid elemental sulfur (either in the form of powdered sulfur or in suspension form) with the solid catalytic particles. This process no longer imposes requirements relative to the conditions of the process with a view to ensuring that the elemental sulfur will thoroughly penetrate the pores of the catalyst by sublimation and/or by melting. The invention relates to a process for ex-situ presulfurization of porous particles of a hydrotreatment catalyst that can be sulfurized and that contains at least one metal or a metal oxide, with the process comprising bringing the catalyst into contact with a presulfurizing agent that contains the elemental sulfur and an organic liquid, characterized in that the process comprises the preparation of the presulfurizing agent in the form of an essentially homogeneous liquid and the impregnation of catalytic particles with said liquid, with the elemental sulfur ultimately being incorporated for the most part into the pores of the catalyst.

The organic liquids that are suitable for forming the presulfurizing agent are those that are liquid at the temperature at which impregnation with the catalytic particles is carried out and which are able, either by themselves or in combination, to form an essentially homogeneous liquid with the elemental sulfur at this temperature. The expression essentially homogeneous liquid that is used in this context relates to a liquid in which the elemental sulfur is essentially dissolved in the case of a temperature that is less than the melting point of the elemental sulfur and, in the case of a temperature that is greater than the melting point of the sulfur, with a liquid which, at this temperature, is either a heated solution or an essentially homogenous mixture of liquids that comprises liquid sulfur. A visual examination makes it possible to determine if a presulfurizing agent is an essentially homogenous or single-phase liquid.

It is possible to cite, as nonlimiting examples of organic liquids that are suitable for forming the presulfurizing agent, aromatic hydrocarbons such as benzene, toluene, xylenes, and more complex hydrocarbons that contain one or more aromatic cores, as well as hydrocarbon mixtures that contain one or more aromatic cores, as well as hydrocarbon mixtures that contain large amounts of aromatic components, such as certain kinds of naphthas and gas oils, for example naphthas and gas oils that are obtained from carbonization units and light gas oils from catalytic cracking. Carbon sulfide, dimethyl sulfide, and dimethyl bisulfide also constitute suitable organic liquids. It is also possible to cite other examples such as mixtures of aliphatic, aromatic and/or olefinic hydrocarbons, such as light gasolines, F-type gasolines, white-spirit gasolines, gas oils, and mineral oils. It is also possible to use lubricating oils or lubricating bases, either in the form of synthesis products, or products of mineral origin. Olefinic hydrocarbons can also be used. A hydrocarbon that comprises at least one olefinic bond and that has at least 8 carbon atoms is referred to as an olefinic hydrocarbon. The olefinic hydrocarbons that are generally used are those that are described in U.S. Pat. No. 5,215,954 that is cited above, for example, decene, dodecene, the NEODENE® 10 olefins, the NEODENE® 14/16 olefins, as well as, preferably, the unsaturated fatty acid triglycerides that are described in U.S. Pat. No. 5,397,756, for example, colza oil, soybean oil, sunflower oil, sunflower seed oil, and animal fats.

For the preparation of the presulfurizing agent that is to be used according to this invention, it will be possible to use one of these suitable organic liquids, but it is also possible, and sometimes even preferable, to use a combination, or mixture, of two or more of them. One skilled in the art will easily be able to select suitable liquid(s) that correspond to his or her needs.

To increase the solubility of the elemental sulfur, it is generally recommended to work at a high temperature during the preparation of the presulfurizing agent and during the impregnation stage itself, with a view of ensuring that, when the presulfurizing agent penetrates the pores of the catalyst, it is done in the form of an essentially homogeneous liquid. As a general rule, in this embodiment, the catalytic particles to be impregnated will also have been brought to a high temperature to prevent any premature cooling of the presulfurizing agent. The temperature of the presulfurizing agent is not necessarily the same as that of the catalytic particles.

A preferred embodiment of the process according to the invention consists in carrying out the impregnation of the catalytic particles with a presulfurizing agent that has a temperature that exceeds the melting point of the elemental sulfur, and also preferably in this case, the catalytic particles themselves are also first brought to a temperature that is greater than the melting point of the elemental sulfur. According to this last embodiment, it is no longer necessary that the presulfurizing agent and the catalyst particles be at the same temperature. The maximum temperatures for the presulfurizing agent and the catalytic particles are not critical and are determined based on practical considerations. As a general rule, the procedure is not performed at temperatures in excess of 250° C.

It is obvious that when the impregnation is carried out at a high temperature, the organic liquids whose boiling points are equal to or less than this temperature should not be used for the preparation of the presulfurizing agent.

According to a particular embodiment of the process according to the invention, a second "sulfur source" is incorporated into the presulfurizing agent, in addition to elemental sulfur, in the form of an organic polysulfide. Such organic polysulfides are described, i.a., U.S. Pat. No. 4,530,917 and correspond to the general formula R–S(n)–R', where n is 2 to 20, preferably in the range of 3 and 20 and R and R' represent organic portions; R' can also be a hydrogen atom. The organic polysulfides that can be easily used comprise those where R and R' each represent a tert-butyl radical, a tert-nonyl radical, or a tert-dodecyl radical, with n having a mean value of 5. These three products are marketed by Elf Aquitaine or under tradenames TPS-54, TPS-37, and TPS-32. Dioctylic polysulfides can also be used. The advantages that the use of a combination of elemental sulfur and organic polysulfides offers, particularly a faster start-up, are disclosed in U.S. Pat. No. 5,139,983.

This combination that is used in this process offers the special advantage according to which the simultaneous use of one or more organic polysulfides within the presulfurizing agent makes it easier to obtain an essentially homogeneous liquid.

In terms of volume, the amount of presulfurizing agent that is to be used is generally such that it corresponds more of less to the total volume of pores of the catalytic mass that is to be presulfurized. More specifically, the ratio of presulfurizing agent volume to the total volume of pores of the catalyst to be filled is generally between 0.6 and 1.1, preferably between 0.7 and 0.9.

As is common practice in the case of ex-situ presulfurization, the total amount of sulfur to be used, i.e., the amount of elemental sulfur that is contained in the organic polysulfide, depends on the amount of metal or metal oxide that is present in the catalyst to be presulfurized. In general, the total amount of sulfur that is used corresponds to 0.5 to 1.5 times the stoichiometric amount of sulfur that it takes to give metals their sulfurized form. The total amount of sulfur that is to be used is preferably between 0.7 and 1.2 times the stoichiometric amount required.

When a combination of elemental sulfur and an organic polysulfide is used, the ratio between these two sulfur sources is preferably selected such that 25 to 90% by weight of sulfur (calculated in the form of S) that is introduced into the pores of the catalyst comes from elemental sulfur, while 10 to 75% by weight comes from organic polysulfide.

In this connection, hydrotreatment catalysts with metal oxide(s) treatable by the invention include, for example:
freshly prepared hydrotreatment catalysts that contain metal oxides of group VIB and/or non-noble metals of group VIII;
regenerated hydrotreatment catalysts that have the same composition as indicated above for freshly prepared catalysts, except that a portion of the metals is not restored in oxidized form;
catalysts that contain noble metals such as platinum, rhenium, and/or palladium, even if these metals have a zero valence; like the metal oxides, these metals can be converted into their sulfides.

The process of ex-situ presulfurization according to this invention, at temperatures that are lower than the melting point of elemental sulfur, including ambient temperature, can be used in a simple manner by implementing methods and devices that are known in the art (see the descriptions of the patents cited above).

The process of presulfurization according to the invention is also easy to implement at temperatures that are greater than the melting point of the elemental sulfur. For example, the presulfurizing agent is first prepared in a receptacle by bringing together the desired components in the desired amounts. They are then heated, preferably while being stirred, until the system is essentially homogenous. The catalytic particles are heated in another receptacle, preferably at a temperature that is equal to or greater than the temperature that is necessary to form the essentially homogenous presulfurizing agent. The heated catalytic particles and the heated presulfurizing agent are then brought into contact; of course, it is clearly quite appropriate to prevent all possible heat losses. It is possible either to add hot catalytic particles to the hot presulfurizing agent or to add the hot presulfurizing agent to hot catalytic particles, for example by evaporating them or pouring them out.

Although the duration of the impregnation stage is not critical, impregnation should, of course, be complete before proceeding to the next stage, with an impregnation time of between 1 and 60 minutes being generally adequate.

If, as indicated above, the amount of presulfurizing agent generally corresponds more or less to the total volume of the pores that are to be filled, the catalytic mass that is left at the end of impregnation will preferably be "dry."

If a relatively volatile liquid such as while spirit or toluene is used, for example to obtain the desired volume of presulfurizing agent, steps can be taken at a later stage to eliminate this liquid totally or partially by evaporation. Of course, in this case also, there will be a "dry" catalytic mass.

Generally, with a view to its use, the presulfurized catalyst that is obtained should be activated, i.e., treated with, for example, a hydrogen-containing gas flow at high temperature, to form the desired metal sulfide. Two methods can be used for this purpose, the in-situ method and the ex-situ method, and this invention also relates to the processes in which presulfurization according to the invention is followed by these two respective activation methods.

In the in-situ method, the presulfurized catalyst is loaded into the reactor in the refinery where it is to be used. It is then activated by passing a hydrogen-containing gas flow through the catalytic bed at a final temperature of about 200° to 450° C. An increasing temperature gradient is generally used. The standard activation times are between 0.5 hour and one day.

The expression "ex-situ activation" means that the presulfurized catalyst is treated with, for example, a hydrogen-containing gas flow outside of the reactor in which the catalyst is to be used, often at another site, and more particularly at the same site as that at which the ex-situ presulfurization according to the invention has been carried out. Generally, the treatment is carried out at a temperature of between 150° and 700° C., preferably between 200° and 500° C., for a period of between about 1 to 10 hours.

In a preferred embodiment of this process, the catalytic particles are kept in motion during the activation stage, for example by carrying out activation in a rotary reactor tank. Taking into account the pyrophoricity of the catalyst that is thus activated, it is preferable to proceed to passivation treatment after the ex-situ activation. This can be carried out by passing an oxidized gas flow through the catalytic mass, thus causing the oxygen to be adsorbed on the surface of the catalyst, preferably at a ratio of 0.2 to 5% by weight, and preferably even at a ratio of 0.8 to 3% by weight relative to the catalyst weight. Another passivation means consists in impregnating the catalyst with a liquid that prevents the oxidation of sulfides at ambient temperatures. The suitable liquids are hydrocarbons, more particularly gas oils and lubricating bases such as a synthetic or mineral oil. After the passivation operation, the catalyst can be transported and loaded into the hydrotreatment reactor by the refiner without danger of inflammation or explosion. Generally, for further details that relate to the ex-situ activation methods, the reader may refer to document EP-A-95,402,216,6.

Finally, this invention relates to the use of catalysts that are activated in this way for hydrotreating hydrocarbon feedstocks. The standard hydrotreatment conditions comprise temperatures of between 100° and 425° C., partial hydrogen pressures of between 0.2 and 15 MPa, total pressures of between 0.5 and 20 MPa, hydrogen/oil ratios of between 20 and 1500 N1/1, and VVH of between 0.1 and 15. The standard hydrocracking conditions comprise temperatures of between 300° and 500° C., partial hydrogen pressures of between 3 and 20 MPa, total pressures of between 5 and 25 MPa, hydrogen/oil ratios of between 200 and 2500 N1/1, and VVH of between 0.1 and 15.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

EXAMPLES

Example 1: Use of TPS37 with elemental sulfur as presulfiding agent at 130° C.

This example concerns the presulfiding of 150 g of a hydrodesulfuration catalyst containing by weight 5% of CoO and 20% of $MoO_3$ on an alumina support (hereinafter referred to as "starting catalyst"). The presulfiding solution comprises 17.2% by volume in the form of elemental sulfur (ES; commercialized by Kali Chemie, Akzo) and 82.8% of TPS37 (organic polysulfide called di tertio nonyl polysulfide, commercialized by Elf Atochem). At 130° C. this mixture of ES and TPS37 gives a perfectly limpid solution. The solution is completed with 65.9% by volume of White Spirit, a heavy petroleum fraction whose initial and final boiling points are respectively 200 and 250° C. (designed by HCl in Table I).

Impregnation of the catalyst pores is completed with this hot solution at 130° C. The solid thus impregnated is brought to 230° C. for 2 hours at a pressure of 10 Torr (1333 Pa, i.e., $13.33 \times 10^{-3}$ bar), in order to evaporate the solvent. The product obtained contains 8.1% S and 5.2% C. This catalyst, called subsequently catalyst A, is characterized by extraction of the sulfur by a soxhlet type method and a self-heating test. This self-heating test is carried out at 140° C. according to a UN test method using a cage with dimensions 2.5×2.5×2.5 cm. The soxhlet extraction tests are carried out using boiling toluene and drying during 30 min. in air at 120° C. The results and the operating conditions are presented in Table 1.

Example 2: Use of TPS37 and elemental sulfur as presulfiding agents en compared with a basic oil type 150N at 130° C.

150 g of the starting catalyst already used in example 1 is impregnated with a solution which is contains identical quantities of TPS37 and elemental sulfur as in Example 1. The solution obtained is perfectly limpid at 130° C. We add to this solution 38.1% by volume of a base oil type 150N (commercialized by Mobil Librifiants) and designated by $HC_3$ in Table 1 and we complete with 27.8% by volume of White Spirit, identical to that used in Example 1. The solid impregnated at 130° C. is brought to 230° C. at a pressure of 10 Torr (1333 Pa, i.e., 13.33×10$^{-3}$ bar) for two hours in order to evaporate the solvent. The final product comprises 7.0% by weight of sulfur and 14% by weight of carbon. This catalyst, called catalyst B, is characterized by extraction by solvent according to a soxhlet type method and a self-heating test. The results and the operating conditions are presented in Table. 1.

Example 3: Use of TPS37 and elemental sulfur as presulfiding agents at 110° C.

150 g of the starting catalyst used in Examples 1 and 2 is impregnated at 110° C. with a solution which contains the same properties of TPS37 and elemental sulfur as in Examples 1 and 2. The catalyst impregnated at 110° C. with the solution mentioned above is homogenized for 10 minutes at 110° C. Then, a quantity of 65.9% by volume of White Spirit identical to that used in Examples 1 and 2 is added at 110° C. and homogenized for 10 minutes. The solid impregnated at 110° C. is brought to 230° C. at a pressure of 10 Torr (1333 Pa, i.e., 13.33×10$^{-3}$ bar) for two hours in order to evaporate the solvent. The final product comprises 8.0% by weight of sulfur and 5.3% by weight of carbon. This catalyst, called subsequently catalyst C, is characterized by extraction of sulfur using a soxhlet type method and a self-heating test. The results and the operating conditions are present in Table 1.

Example 4: Use of TPS37 and elemental sulfur as presulfiding agents combined with an olefin type C12 or 1-dodecene 150 g of the starting catalyst used in Examples 1-3 is impregnated at 130° C. with a solution which comprises 18.4% by volume in the form of elemental sulfur (commercialized by Kali Chernie, Akzo), 38.2% by volume of TPS37 (commercialized by Elf Atochem) and 43.6% by volume of an olefin 1-dodecene (designed by $HC_2$ in Table I) at 130° C. This mixture of ES, TPS37 and C12 gives a perfectly limpid solution. The solution is completed at 130° C. with 56.8% by volume of White Spirit, identical to that used in Examples 1-3. Impregnation of the catalyst pores is completed with this hot solution at 130° C. The solid thus impregnated is brought to 230° C. for 2 hours at a pressure of 10 Torr (1333 Pa, i.e., 13.33×10$^{-3}$ bar) in order to evaporate the solvent. The product obtained comprises 7.8% by weight of sulfur and 10% by weight of carbon. This catalyst, called subsequently catalyst D, is characterized by extraction of sulfur using a soxhlet type method and a self-heating test. The results and the operating conditions are presented in Table 1.

Example 5: Use of TPS54 and elemental sulfur as presulfiding agents combined with an olefin type C12 or 1-dodecene 150 g of the starting catalyst already used in Examples 1-4 is impregnated at 130° C. with a solution which comprises 21.3% by volume in the form of elemental sulfur (commercialized by Kali Chemie, Akzo), 28.2% by volume of TPS54 (commercialized by Elf Atochem) and 50.5% by volume of an olefin of type 1-dodecene at 130° C. This solution is perfectly limpid. The solution is completed at 130° C. with 62.6% volume of White Spirit, identical to that used in Examples 1-4. Impregnation of the catalyst pores is completed with this hot solution at 130° C. The solid thus impregnated is brought to 230° C. for 2 hours at a pressure of 10 Torr (1333 Pa, i.e., 13.33×10$^{-3}$ bars), in order to evaporate the solvent. The product obtained comprises 7.9% by weight of sulfur and 9.7% by weight of carbon. This catalyst, called subsequently catalyst E, is characterized by extraction of sulfur using a soxhlet type method and a self-heating test. The results and the operating conditions are presented in Table 1.

Example 6: Use of TPS37 and elemental sulfur as presulfiding agents combined with an olefin type C12 or 1-dodecene, using p-xylene as solvent 160 g of the starting catalyst used in Examples 1-5 is impregnated at 130° C. with a solution which comprises 25.6% by volume in the form of elemental sulfur (commercialized by Kali Chemie, Akzo), 13.7% by volume of TPS37 (commercialized by Elf Atochem) and 60.7% by volume of an olefin of type 1-dodecene. At 130° C. this solution is limpid. The solution is completed with 60.1% by volume of p-xylene.

Impregnation of the catalyst pores is completed by this hot limpid solution at 130° C. The solid thus impregnated is brought to 230° C. under atmospheric conditions in order to evaporate the solvent. The product obtained comprises 7.2% by weight of sulfur and 12% by weight of carbon. This catalyst, called subsequently catalyst F, is characterized by a method of sulfur extraction according to a soxhlet type method and a self-heating test. The results and the operating conditions are presented in Table 1.

Example 7: Use of elemental sulfur and DMDS as agents de sulfuration combined with a olefin type C12 (or 1-dodecene) using p-xylene as solvent 150 g of the starting catalyst used in Examples 1-6 is impregnated at 105° C. with a solution which comprises 5.4% by volume in the form of elemental sulfur (commercialized by Kali Chemie, Akzo), 81.9% by volume in the form of DMDS (dimethyl disulfide, commercialized by Elf Atochem) and 12.7% by volume of olefin type C12 or 1-dodecane. At 105° C. this solution is limpid.

Impregnation of the catalyst pores is completed with this solution at 105° C. The solid thus impregnated is brought to 230° C. The product obtained comprises 8.0% by weight of sulfur and 5% by weight of carbon. This catalyst, called subsequently catalyst G, is characterized by a method of extraction of sulfur according to a soxhlet type method and a self-heating test. The results and the operating conditions are presented in Table I.

| Example | 1 | 2 | 3 | 4 | 5 | 6 | 7 |
|---|---|---|---|---|---|---|---|
| Catalyst | A | B | C | D | E | F | G |
| Sulfur Source 1 (%) | 50 ex SE* | 50 ex SE | 50 ex SE | 70 ex SE | 70 ex SE | 90 ex SE | 14 ex SE |
| Sulfur Source 2 (%) | 50 ex TPS37 | 50 ex TPS37 | 50 ex TPS37 | 30 ex TPS37 | 30 ex TPS54 | 10 ex TPS54 | 86 ex TPS37 |
| Olefin C12 (% wt.) | — | — | — | 11.3 | 16.5 | 2.62 | 3.4 |
| Mineral oil 380–450° C. (% wt.) | — | 35.4 | — | — | — | — | — |
| T-impregnation (° C.) | 130 | 130 | 110 | 130 | 130 | 130 | 105 |
| T-treatment (° C.) | 230 | 230 | 230 | 230 | 230 | 230 | 230 |
| % S1 | 8.1 | 7.0 | 8.0 | 7.8 | 7.9 | 7.2 | 8.0 |
| % C1 | 5.2 | 14.0 | 5.3 | 10.0 | 9.7 | 12.0 | 5.0 |
| % LOI1 | 12 | 24 | 12 | 15 | 15 | 17 | 13 |
| % S2 (after extraction) | 8.0 | 7.8 | 7.7 | 7.6 | 7.7 | 7.1 | 7.8 |
| Self-heating | positive | negative | positive | positive | positive | positive | positive |

*SE - elemental sulfur

The preceding examples can be repeated with similar success by substituting the generically of specifically described reactants and/or operating conditions of this invention for those used in the preceding examples.

The entire disclosure of all applications, patents and publications, cited above, and hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed:

1. A process for ex-situ presulfurization of porous particles of a hydrocarbon hydroconversion catalyst that contains at least one metal oxide, comprising contacting catalytic particles with a presulfurizing agent that contains elemental sulfur and at least one organic liquid, wherein the presulfurizing agent is in the form of an essentially homogenous liquid in which elemental sulfur is dissolved therein wherein said elemental sulfur is incorporated into the pores of the catalyst.

2. A process according to claim 1, wherein the preparation of said presulfurizing agent comprises a heating stage.

3. A process according to claim 1, wherein the presulfurizing agent also contains an organic polysulfide.

4. A process according to claim 3, wherein the organic liquid is one or more aromatic hydrocarbons, one or more gasolines, one or more gas oils, one or more lubricating bases, one or more olefinic hydrocarbons, white spirit or a mixture thereof.

5. A process according to claim 4, wherein the olefinic hydrocarbon is a fatty acid triglyceride.

6. A process according to claim 1, wherein the ration of presulfurizing agent volume to the pore volume of the catalyst is between 0.6 and 1.1.

7. A process according to claim 1, further comprising treating the presulfurized catalytic particles by a reducing agent.

8. A process according to claim 1, further comprising treating the presulfurized catalytic particles with a hydrogen-containing gas flow, at a temperature of between 150° and 700° C., so as to sulfurize at least a substantial portion of metal or metal oxides therein.

9. A process according to claim 8, wherein treating with the hydrogen-containing gas is carried out ex-situ.

10. A process according to claim 9, wherein during said treatment with a hydrogen-containing gas flow, the catalytic particles are kept in motion.

11. A process according to claim 9, wherein after said treatment with a hydrogen-containing gas flow, the catalytic particles are subjected to passivation treatment.

12. A process according to claim 11, wherein said passivation is carried out in the presence of a stream of gas that contains oxygen.

13. A process according to claim 1, further comprising loading the presulfurized catalytic particles into a hydrotreatment reactor and heating to a temperature of between 200° and 450° C., in the presence of a hydrogen-containing gas flow, to sulfurize metal or metal oxides contained in the catalyst.

14. A process according to claim 1 wherein the presulfurizing agent is in totally liquid form.

* * * * *